Aug. 3, 1965     HIROO ASHIDA     3,199,095
ABSORBED-MOISTURE ALARM UTILIZING ELECTROLYTIC
ACTION BY SPECIAL GALVANIC COUPLE
Filed Feb. 13, 1961     3 Sheets-Sheet 1

INVENTOR.
Hiroo Ashida

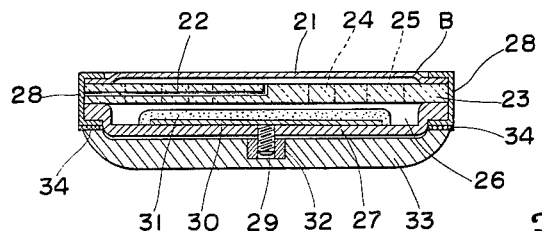
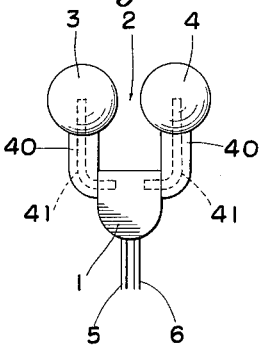
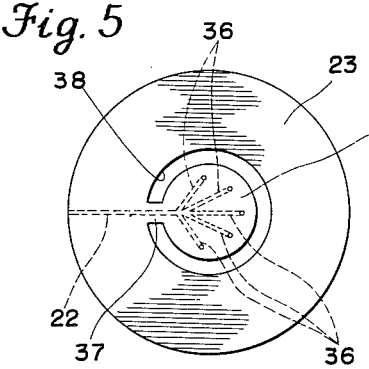
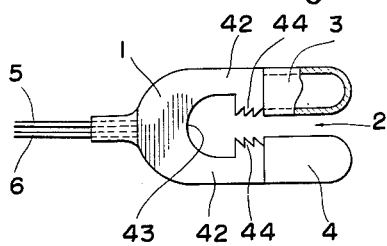

Aug. 3, 1965   HIROO ASHIDA   3,199,095
ABSORBED-MOISTURE ALARM UTILIZING ELECTROLYTIC
ACTION BY SPECIAL GALVANIC COUPLE
Filed Feb. 13, 1961   3 Sheets-Sheet 3
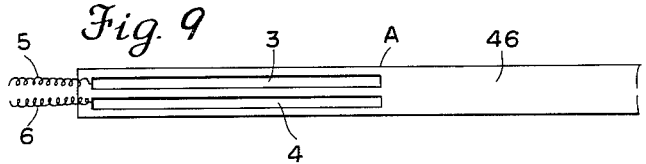
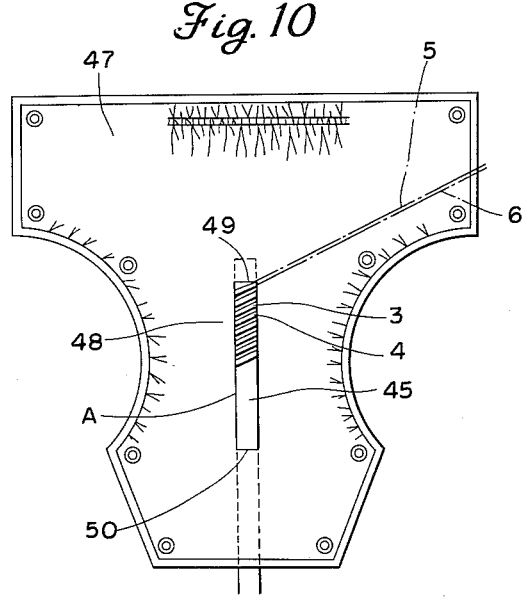
INVENTOR.
BY

United States Patent Office 3,199,095
Patented Aug. 3, 1965

3,199,095
ABSORBED-MOISTURE ALARM UTILIZING ELECTROLYTIC ACTION BY SPECIAL GALVANIC COUPLE
Hiroo Ashida, 68 Gamo-cho 5-chome, Joto-ku, Osaka, Japan
Filed Feb. 13, 1961, Ser. No. 88,974
Claims priority, application Japan, Oct. 5, 1960, 35/40,860
1 Claim. (Cl. 340—235)

This invention relates to an absorbed-moisture alarm. More particularly, this invention relates to a color-presenting absorbed-moisture alarm utilizing electrolytic action.

This invention is characterized by the use of a special galvanic couple having a pair of electrodes placed in opposition to each other which are made of different kinds of metallic materials or substances which tend to be ionized differently, said galvanic couple being easily put on and taken off from within a body to be checked for moisture, lead wires from said galvanic couple to a detector which consists of a sealed receptacle containing another pair of electrodes made of different kinds of metallic materials like those mentioned above, and an electrolytic solution whose color varies in accordance with the flow of an electric current, giving rise to a phenomenon presenting varied colors, such as red, etc., at an indication part on the detector through an extremely small amount of electric current generated at the galvanic couple at the time moisture occurs inside the body, thereby permitting the easy detection of the occurrence of moisture in the body remotely therefrom.

One of the objects of this invention is to provide a means to accurately detect the occurrence of moisture immediately after a part of an object, whatever it may be, is moistened by the outflow of liquid or substance containing moisture. Another object of the invention is to completely eliminate the inconvenience and trouble caused by a baby's evacuation of urine or excrement, heretofore not being known until the baby complains and a piece of cloth, such as, for example, a diaper is exposed and opened. Also, another object of the invention is to make the performance of a galvanic couple strikingly precise and, at the same time, to improve the performance of electrodes in a color-variable electrolytic solution contained in the detector operating as an indication part by associating said electrolytic solution with a special air chamber or by using an electrolyte combined of phenolphthalein and salt solution as said electrolytic solution, thereby making the color indication distinct and keeping durability for repeated use for a long time.

Referring now to the drawings, wherein like reference characters designate like or corresponding parts throughout the several views, the invention is demonstrated as follows:

FIG. 4 is a longitudinal sectional side view of the main body of said alarm;

FIG. 5 is a top plan view of an indication board provided with electrodes for giving highly efficient coloring property;

FIGS. 6 and 7 are top plan views each showing an embodiment of a galvanic couple;

FIGS. 8 and 9 are top plan views each showing an embodiment of a galvanic couple ready for fixing to a diaper cover; and FIG. 10 is a diagram showing an example of a galvanic couple fixed to said diaper cover.

Figure 1:
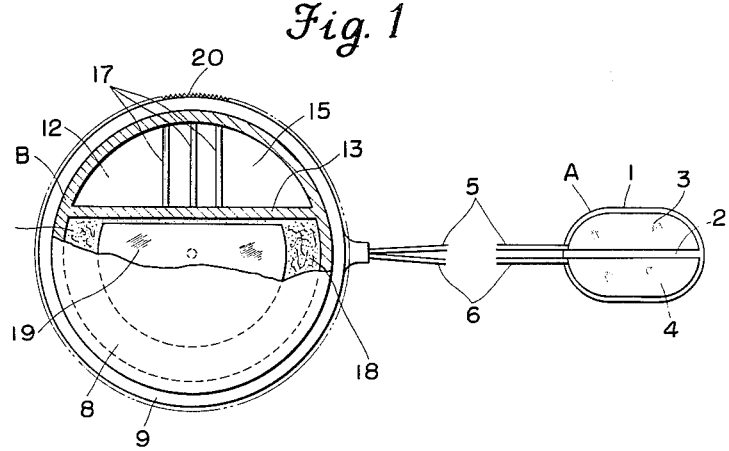
FIG. 1 is a partial sectional top plan view showing one embodiment of an alarm according to this invention.
Figure 2:
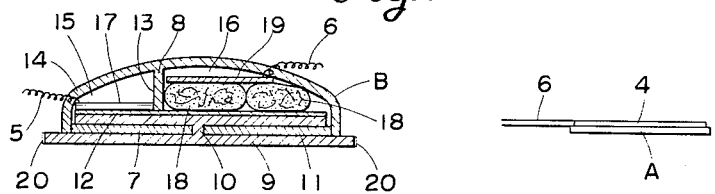
FIG. 2 is a longitudinal sectional side view of the same.

To explain this invention by first referring to FIGS. 1 and 2: A is a galvanic couple which comprises a supporter 1 made of insulating material, with a gap 2 provided therein, and anode and cathode electrodes 3 and 4 fixed, one made of silver, etc. and the other zinc, etc. The electrodes 3 and 4 are made from different kinds of metallic materials which tend to be ionized differently, said electrodes being connected to lead wires 5 and 6. Also, B is a detector which comprises a casing constructed of a base panel 7 and a cover 8, both being made of plastic material, etc., a rotary panel 9 made also of plastic material, etc. which is provided onto the lower surface of said panel 7, and a supporting axis 10 which, situated at the center of said rotary panel, passes through the base panel 7 and connects itself directly to a white base panel 11 situated on the base panel 7, the upper surface of said white base panel 11 being coated with a film 12 of a vinyl solution of phenolphthalein.

Figure 3:
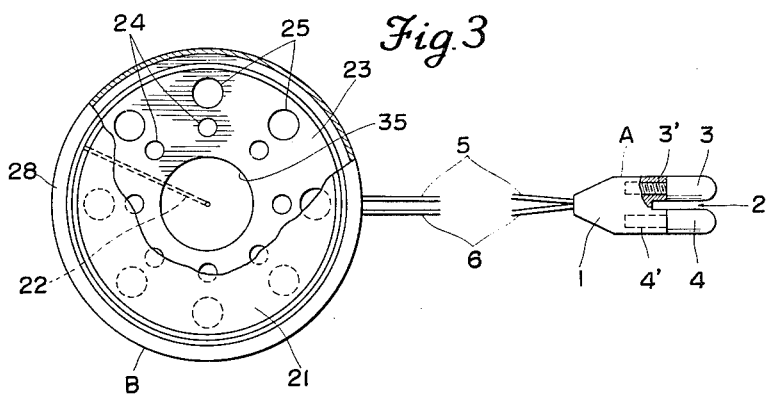
FIG. 3 is a partial sectional top plan view of another embodiment.

The space above said white base panel 11 is partitioned into two chambers, large and small, by a bulk-head 13 hanging down vertically from the cover 8, one being an electrolyte-containing chamber 16 and the other an air chamber 15 having an air vent 14 at a part thereof. The part of the cover 8 facing on the air chamber 15 is transparent. At the bottom part of the air chamber 15, an electrode wire 17, which is a fine wire made of silver, etc., is fixed to cover 8 and bulkhead 13 so as to slightly touch the top of the film 12, and in the chamber 16, there is contained a material 18, such as cotton, etc. impregnated with an electrolytic solution, such as salt solution, etc., which generates an alkaline substance by electrolysis, and on said material is provided an electrode plate 19 of zinc, etc. wrapped in blotting-paper, etc. To said electrode wire 17 and electrode plate 19 are connected the above-mentioned lead wires 5 and 6 respectively by an appropriate means. Also, the surface of the periphery of the rotary panel 9 is knurled 20 or the like to simply revolving the panel. The one shown in FIGS. 3 and 4 is a modification of this invention, wherein a galvanic couple A is almost identical with that mentioned above, the same marks denoting the same parts and materials, and it comprises electrodes 3 and 4 provided so as to have the legs 3' and 4' thereof screw-engaged with or fitted into a supporter 1 to form a bar- or lever-like body. Also, a detector B having lead wires 5 and 6 comprises an indication board 23 made of plastic material, etc., into which are inserted a plastic transparent board 21 and an electrode wire 22, such as stainless steel wire, etc, superimposed one upon the other leaving a narrow gap therebetween so as to form a sandwich, said indication board 23 having a desired number of transparent holes 24 and 25, large and small, provided on the surface thereof, and a base panel 27 upon which said indication board is superimposed so as to form a reception chamber 26, all parts and materials being encircled by an annular belt 28 made of electricity-conducting material. A screw 29 is provided in said base panel 27 so as to project therefrom, and, in contact with said screw 29, there is arranged an electrode plate 30 made of zinc, etc., the working surface of which is covered with a liquid-absorbing plate 31. Into the reception chamber 26 is first poured phenolphthalein which adheres to the circumferential inner surfaces of the base panel 27, and then sealed in said chamber 26 is an electrolytic solution, such as salt solution, etc., like in FIGS. 1 and 2. Further provided are a cover 33 made of plastic material, etc. which has a nut 32 set therein, which nut is engaged with the above-mentioned screw 29, and an electricity-conducting ring belt 34 which is fixed to the periphery of said cover 33 and is connected to the above-mentioned annular belt 28, the lead wires 5 and 6 being connected to said ring belt 34 and nut 32, and the electrode wire 22 being connected to the annular belt 28. The transparent board 21, indication board 23 and base panel 27 are all elastic and can be transformed according to the way of engaging the screw 29 with the nut 32, and thereby the gap between the transparent board 21 and the indication board 23 can freely be adjusted. At the center of an indication board 23, a white part 35 is formed. In the detector B shown in FIG. 5, in order to present the colors clearly throughout a wide range, a plurality of branch wires 36 are sent out to the center from an electrode wire 22 inserted in the sandwich form in the indication board 23. In this case, it is preferable to shape the transparent hole of the board 23 in a slit 38 having a supporting part 37 at a part of such a concentric circle as is illustrated, and, also, to shape the supporting board 39 for a plurality of electrode branch wires 36 in a disk so as to vibrate freely.

FIG. 6 is a modification of a galvanic couple A, which is made freely attachable to and detachable from core-levers 41, 41 of the lead-wire having ball-like electrodes 3 and 4 set in two arm parts 40, 40 of a supporting body 1 of plastic material with a gap 2 left therebetween.

In FIG. 7, the device comprises a supporting body 1 shaped like a plate of elastic plastic material and having the two side-levers 42, 42 which are in parallel with each other with an opening 43, electrodes 3 and 4 which are provided, with a gap 2 therebetween, at the forward end of said side-levers 42, 42, and a biting part 44 in toothed form on each side facing the opening 43 of the side-levers 42. This biting part is for holding a part of the main body to be detected, such as cloth, etc., thereby preventing the thermocouple from getting out of place. Also, FIGS. 8 and 9 show a galvanic couple A ready for fixing to a diaper cover, etc., the one in FIG. 8 having the aforesaid electrodes 3 and 4 fixed in the parallel spiral form around the periphery of a flexible soft supporter 45 made of plastic material, etc.

Further, in FIG. 9, electrodes 3 and 4 are fixed in the band form to a supporter 46. In FIG. 10, the aforesaid galvanic couple A is fixed through the illustrated slits 49 and 50 so as to be freely attachable to and detachable from the crotch part 48, etc. of a diaper cover 47, in which case the detector B shown in FIG. 1 or in FIG. 3 can be used freely.

The construction of this invention is as mentioned above. Now to outline the action thereof: in using this invention in the body to be detected, such as, for example, a diaper cover, which is put to the privates of an infant to receive excrement, a galvanic couple A is inserted in the part of a diaper cover to be moistured by evacuation, then, when a moistured state begins because of evacuation, there is generated electricity between two electrode pieces 3 and 4, and an electric current is supplied through lead wires 5 and 6 to the indication board 23, electrode wire 17 and electrode plate 19 and is discharged into an electrolyte, such as salt solution, etc., contained in the electrolytic-solution material 18 in the reception chamber 16, with the result that the moisture with the solution commingled with the film 12 which is in contact with the electrode wire 17 situated on the upper surface of the base panel 11 is colored red by an alkaline substance formed through electrolysis of the salt solution, and said coloring can be seen through the transparent part of the cover 8. In this case, if the inside of the reception chamber 16 is coated white, then, after use, by rotating the rotary panel 9, the red-changed part is rotated and exposed to the side of the air chamber 15 and it passes through the reception chamber 16, at which time the part colored red is scattered and neutralized by both an acidic substance formed near the electrode plate 19 and the salt solution of the electrolytic-solution material 18, and returns to the original white color unless the surface of the film 12 is damaged by excessive electric current.

That is to say, it is sufficient only to place the detector B outside the body to be detected, and there is no necessity for undressing and opening and examining a diaper cover, etc, each time; consequently, there is an advantage that detection can be made simply by merely using an air chamber as a color-presenting part and examining the change in color (white to red) from the outside by means of both the electrolytic action of an electrolytic solution utilizing an extremely small amount of electric current generated at the galvanic couple and the film 12. In this case, if the electrode wire 17 is arranged so that a thin layer of solution which has adhered onto the film 12 by the electrolytic-solution material 18 and which changes in color by the flow of an electric current may come in contact with air, then the product produced through electrolysis effectively acts so as to present the red-color. It has been confirmed that in a device constructed in the size of a detector of 20 mm. in diameter and 6 mm. in thickness, the changing of color into red is clearly observed within 1–2 minutes at a low current of 10–15 $\mu$a., and because of extremely high sensitivity, and, also, because the working current is very small, it is possible to make the device small-sized; if the discharge of a small amount of current is aided by using different kinds of metal plates which tend to be ionized differently as two electrodes of the galvanic couple A, then, for generating an appropriate working current which is 10–15 $\mu$a., it is sufficient only to insert a current limiting resistor of 70–100 K$\Omega$ in series, the device being little affected by a change in the resistance peculiar to the body to be moistened, and, also, the state of color-retention can be improved by using a film of phenolphthalein.

To give an explanation with regard to the embodiments shown in FIGS. 3 and 4; the use of a thermocouple A and the state of an electric current being generated are the same as in the cases of FIGS. 1 and 2, but if evacuation now takes place, then, with an induced electromotive force which is about 0.1 v.–0.3 v., the current at one pole side flows from ring belt 34 and annular belt 28 to an electrode wire 22 through lead wires 5 and 6 and the current at the other pole side, when a lead wire is connected in advance to the nut 32 part, flows through nut 32 and screw 29 to an electrode plate 30, then the current of 2–8$\mu$a. is discharged from the forward end of the electrode wire 22, and thereby the aqueous salt solution mixed with the surface to which phenolphthalein stuffed in the chamber 26 has adhered is colored by a strong alkaline substance produced at the vicinity of the electrode wire 22, and the one colored red is enlarged inside a narrow gap between the transparent board 21 and the indication board 23, with the result that, in 2–3 minutes, a red circle of about 5 mm. in diameter comes to be observed on the white surface. In this case, the elimination thereof after use is different from that mentioned above which is effected by rotation; the red-circular part is eliminated, being neutralized and scattered through transparent holes 24 and 25 on the indication board 23 by lightly vibrating the transparent board 21 with the tip of a finger-nail, etc. In that case, the base panel 27 is bent according to the degree of fastening of the screw 29 and the nut 32 and, also, the transparent board 21 moves together by the internal pressure of the receptacle, thereby freely adjusting the gap between said board and the indication board 23; therefore, even when the volume of the solution contained is somewhat changed through use for a long time, the thickness of a solution-film at the red-colored part can be best maintained according to the way of fastening. According to this system, it is possible to have the device operate without any deterioration in its performance ability even used continuously for three months. Incidentally, in using stainless steel and zinc as electrodes, the use of zinc at the anode side ensures effective discharge even in the case of the induced electromotive force of low electric potential, and, also, because the solution is less contaminated, as well as because of the residual solution after electrolysis, the change by electrolysis of the zinc surface, the solution voltage being low, etc., there is almost no fear of hydrogen being generated. Also, in the embodiments shown in FIGS. 1 and 2 and FIGS. 3 and 4, the wrapping of an electrode plate in the solution with a solution-absorbing plate 31, such as blotting-paper, etc., is to prevent uneven discharge on the surface, and, further, the providing of a bulk-head 13 in FIGS. 1 and 2 is to prevent the solution contained in the chamber 16 from getting in excess into the air chamber 15. Also, in each of the above-mentioned embodiments, in order to make the red-color indication more clear over a wide area, and, at the same time, to shorten the time required for said color indication, it is sufficient only to shape an electrode wire 22 so as to have a plurality of branch wires 36 divided therefrom to the center, as shown in FIG. 5; if said electrode wire is so shaped, then, in the discharging of an electric current generated, the same begins to be discharged simultaneously from the end of each of the branch wires 36, and, therefore, the red color is clearly exposed momentarily over a wide range, with the result that the detection from long distances is made accurate and is also made prompt and easy in short distances, and, thus, the device is ideal for the purpose intended. Also, in the cases mentioned above, or in order to promptly scatter and neutralize an excess colored substance produced with the increase in the working current when the device is let alone for many hours, in case the supporting board 39 which acts as a color-indication part is vibrated by using the transparent slit 38 of the board 23 and the supporting part 37 with the tip of a finger-nail according to its elasticity caused by a punching process, the formed solution of contrary nature at the reverse side is taken up promptly and collectively in a large amount and is promptly and easily mixed and neutralized with the colored solution and scattered. Also, FIGS. 6 and 7 show other embodiments of a galvanic couple A; in the case of FIG. 6, electrodes 3 and 4 are shaped like a small ball 3 mm.–5 mm. in diameter, one made of carbon or silver and the other zinc, etc., all being different kinds of electricity-conducting substances, said electrodes being fitted, through a hole cut or a screw-hole formed therein, to the core-lever 41 of a lead wire, such as steel wire, etc., so as to be attachable and detachable freely, said core-lever 41 being set in two arm-parts 40 of a supporting body 1.

This system makes it possible to simply change the sensitivity of the electrodes 3 and 4 to an appropriate one according to summer and winter, and, at the same time, to easily hold pieces of cloth, etc. to be moistened therebetween. The one shown in FIG. 7 is designed so that, in holding a part of the cloth-body, the holding is made accurate so as not to let a diaper cover, etc. get out of place even when baby moves bending and stretching itself. In this embodiment, the holding is made accurate by using an elastic plastic material as a supporting body 1 and forming biting parts 44, 44 at a part facing on an opening 43 of flat side levers 42, 42; moreover, in this case, because the device is wholly flat and not bulky, it can easily be inserted and fixed and thereby fits the small-sizing purpose. Also, there is a point of advantage that the device can well be used regardless of the thickness of pieces of cloth, etc.

In the embodiments shown in FIGS. 8 and 9, it is specially possible to fix the device to a diaper cover as one body and, at the same time, to expand the sensitivity over a wider range so as thereby to correctly detect at any part of the inserted place; here, because, as freely-flexible belt-shaped soft supports 45 and 46 made of plastic materials, etc., electrodes 3 and 4 made of different kinds of metallic materials are provided in parallel with and in opposition to each other or in the form of spiral parallelism, the holding part thereof is long, and, moreover, there is no inconvenience for the baby's exercises in bending and stretching itself, and, also, whenever an evacuated substance runs against any part thereof, the device operates promptly and thus the detecting sensibility is sharpened greatly. The one shown in FIG. 10 is a diaper cover 47 using the device shown in FIG. 8; this diaper cover with a galvanic couple A fixed onto the crotch part 48 thereof is ideal for use as one which acts as mentioned in each of the above-mentioned embodiments.

Obviously many modifications and variations of the present invention are possible in the light of the above teachings. It is therefore to be understood, that within the scope of the appended claim, the invention may be practiced otherwise than as specifically described.

What is claimed is:

A color-presenting absorbed-moisture alarm comprising an insulator support, a pair of dissimilar metal electrodes mounted in spaced relation on the support, an indicator comprising a container, a similar pair of dissimilar metal electrodes mounted in spaced relation in the container, an electrolytic solution in said container and indicator means in said container responsive to a current flow therethrough by a change in color, and electric leads connecting said pairs of electrodes in electrical circuit wherein the support for the electrodes comprises a Y-shaped member, and teeth formed on the facing legs of the Y.

References Cited by the Examiner

UNITED STATES PATENTS

| 1,749,826 | 3/30 | Lubach | 340—235 |
| 2,681,571 | 6/54 | Becker | 340—235 |
| 3,046,786 | 7/62 | Tessem | 73—356 |
| 3,056,935 | 10/62 | Jensen | 73—335 |

FOREIGN PATENTS

| 549,869 | 8/56 | Belgium. |
| 138,835 | 2/20 | Great Britain. |
| 204,499 | 10/23 | Great Britain. |

OTHER REFERENCES

Popular Mechanics, April 1943, page 87.

NEIL C. READ, *Primary Examiner.*

BENNETT G. MILLER, *Examiner.*